United States Patent [19]
Dunne et al.

[11] Patent Number: 5,979,981
[45] Date of Patent: *Nov. 9, 1999

[54] DUAL MODE INFANT HEAD REST

[75] Inventors: Debra L. Dunne, Trubuco Canyon; Shirley Pepys, Balboa Island, both of Calif.

[73] Assignee: Noel Joanna Inc., Margarita, Calif.

[*] Notice: This patent is subject to a terminal disclaimer.

[21] Appl. No.: 08/994,839

[22] Filed: Dec. 19, 1997

[51] Int. Cl.$^6$ .................................................. A47C 31/00
[52] U.S. Cl. ........................ 297/219.12; 5/655; 297/397
[58] Field of Search .............................. 297/219.12, 397, 297/250.1; 5/655, 922, 633

[56] References Cited

U.S. PATENT DOCUMENTS

| | | | |
|---|---|---|---|
| 3,995,335 | 12/1976 | Neely | 5/633 |
| 4,779,930 | 10/1988 | Rosen | 297/397 X |
| 5,103,514 | 4/1992 | Leach | 5/655 X |
| 5,228,745 | 7/1993 | Hazel | 297/219.12 X |
| 5,486,037 | 1/1996 | Harper | 297/219.12 X |
| 5,586,351 | 12/1996 | Ive | 5/655 |
| 5,699,569 | 12/1997 | Schwarz-Zohrer | 5/655 |
| 5,735,576 | 4/1998 | Pepys et al. | 297/397 |

*Primary Examiner*—Peter M. Cuomo
*Assistant Examiner*—Stephen Vu
*Attorney, Agent, or Firm*—Knobbe Martens Olson & Bear, LLP

[57] ABSTRACT

An adjustable head support for use with a child ranging in size from a small infant to a toddler. A soft pliable body structure has a main body portion and an upper portion, and a pair of flanking openings provided on opposite sides between the main body portion and the upper portion. A pair of fastener elements is located on the main body portion adjacent a different one of a pair of flanking openings. The upper portion has a cushion element permanently arranged along the periphery and terminating in a pair of ends. Each end has a fastener engagement member adapted to be secured by a corresponding one of the fastener elements. A plurality of supplemental fastener elements is arranged on the upper portion inboard of the cushion element, and a supplemental cushion element having mating fastener elements removably attached to the upper portion inboard of the cushion element.

19 Claims, 2 Drawing Sheets

DUAL MODE INFANT HEAD REST

BACKGROUND OF THE INVENTION

This invention relates to head supports in general, and more particularly pertains to a head support for use with swings, strollers, conventional car seats and infant carrier/car seats.

The need for a head support for infants and toddlers is well established in the prior art. In general, several different types of head support designs are known which share a common purpose in providing support for the head of a premature baby, an infant or a toddler when the infant or toddler is installed in a conventional car seat, a combination infant carrier/car seat, a swing, a stroller or other devices used to transport infants and toddlers. Some head supports are designed and dimensioned to be suitable for use with only infants; others are designed and dimensioned to be suitable for use only with toddlers. Still others represent attempts to provide a head support suitable for use with both infants and toddlers.

The first two types of head support, while useful, have limited utility specific to the size of the child, and are not designed for a premature baby. Thus, a head support designed for use with an infant cannot be used safely with a toddler and vice-versa. This often requires the purchase of two different head supports by a parent over an approximate four-year span, which is uneconomical. Head supports which have been designed for use with both infants and toddlers typically contain separate add-on components to expand the dimensions of the support, several individually adjustable elements in order to provide the dimensional adjustments, or both. Ideally, a head support designed for both infants and toddlers, as well as premature babies, should be relatively inexpensive to manufacture and exceedingly simple to install and adjust to the size of the child.

SUMMARY OF THE INVENTION

The invention comprises a head support which is suitable for use with premature babies, infants and toddlers which is relatively inexpensive to manufacture, simple to install and use, and adaptable to provide head support for children ranging in size from premature to infant to toddler.

In its most general aspect, the invention comprises a soft pliable body structure having a main body portion and an upper portion, a pair of flanking openings provided on opposite sides of the structure between the main body portion and the upper portion in order to provide safety belt apertures, a pair of fastener elements each located on the main body portion adjacent a different one of the pair of flanking openings, a cushion element arranged along the periphery of the upper portion and terminating in a pair of ends, each end having a fastener engagement member adapted to be secured by a corresponding one of the fastener elements, a plurality of secondary supplemental fastener elements arranged on the upper portion inboard of the cushion element, and a supplemental cushion elements removably attachable to the upper portion inboard of the first cushion element.

The fastener elements each preferably comprise a foldable flap of fastener material, and the fastener engagement member preferably comprises a closed loop formed by an extension of binding material extending along the outer periphery of the upper portion.

The main body portion preferably terminates in a pair of leg segments separated by a gap for accommodating a child seat restraint. The pliable body structure also preferably comprises outer panels and a padding material positioned therebetween.

With the supplemental cushion element removed, the support can be used for large infants or a small toddler. With the supplemental cushion element installed, the support can be used for a small infant.

For a fuller understanding of the nature and advantages of the invention, reference should be had to the ensuing detailed description taken in conjunction with the accompanying drawings.

DETAILED DESCRIPTION OF THE PREFERRED EMBODIMENT

Figure 1:
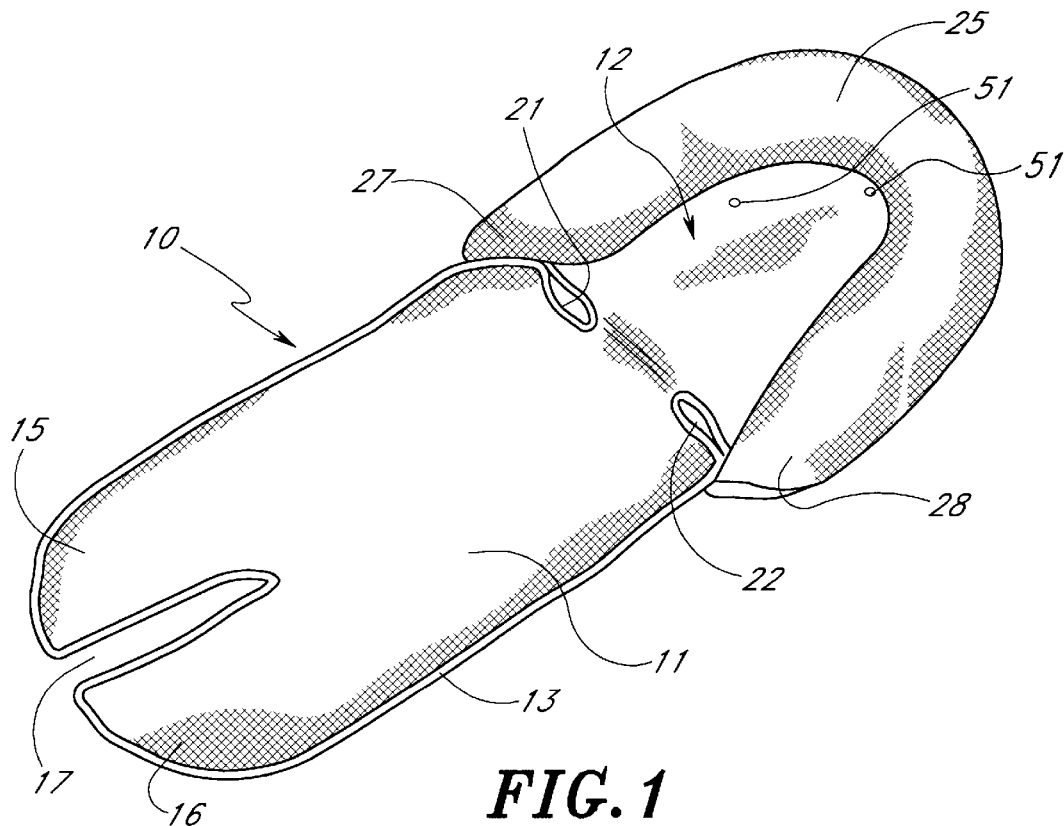
FIG. 1 is a top perspective view illustrating a preferred embodiment of the invention with the supplemental cushion element removed.

Turning now to the drawings, FIG. 1 is a perspective view of the front side of a preferred embodiment of the invention illustrating a first mode of use in which a supplemental cushion element is not used. As seen in this figure, the support, which is generally designated with reference numeral 10, has a main body portion 11 and an upper portion 12.

Support 10 is preferably fabricated from two panels of fabric material, with the upper or facing panel visible in FIG. 1 preferably composed of polycotton terrycloth. The two panels are sewn together by means of a perimeter binding material 13, with a suitable padding fill material, such as polyester foam, in between. Main body portion 11 terminates at the lower end in a pair of spaced leg portions 15, 16 having a gap 17 therebetween. Gap 17 provides a central opening through which the crotch portion of a child's seat restraint belt set (not shown) can be extended.

Main body portion 11 and upper portion 12 are partially delineated by a pair of flanking openings 21, 22 formed along the perimeter of support 10. Openings 21, 22 accommodate the shoulder belts (not shown) of a child's seat restraint belt set.

Figure 3:
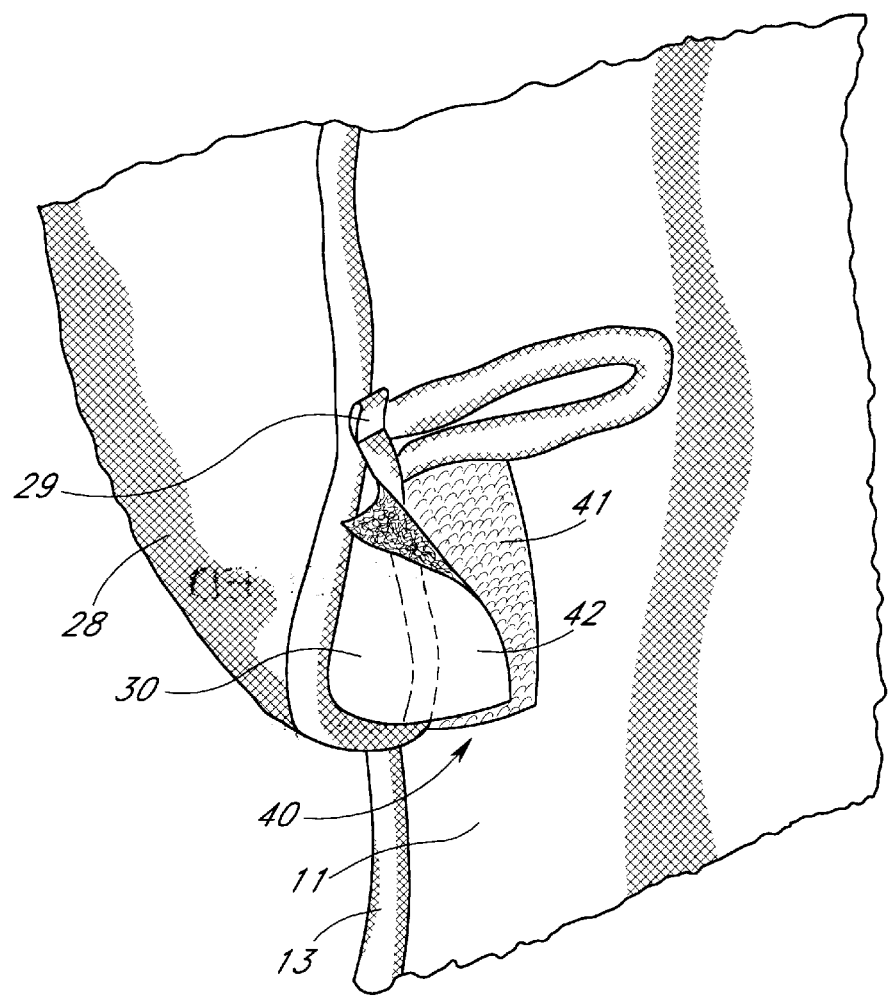
FIG. 3 is an enlarged detail view of one of the fastener elements add fastener engagement members.

Extending about the periphery of upper portion 12 is a head cushion element 25 formed from the same material as portions 11 and 12 and secured along the periphery thereof in any suitable fashion, such as by sewing. In the preferred embodiment, cushion element 25 is integrally formed from the same materials used to form portions 11, 12. However, additional fill material is inserted between the front and back panels to provide the additional cushioning desired for the child's head and neck. Cushion element 25 has a pair of free ends 27, 28 which extend slightly below openings 21, 22. The ends 27, 28 are finished preferably in the same manner as main body portion 11: viz. by means of a binding tape material. As best shown in FIG. 3 for end 28, the binding material is extended beyond the terminus of end 28 for a preselected length and sewn back to the binding edge at 29 to form closed loop 30 which functions as a fastener engagement member.

Secured to the back side of main body portion 11 is a hook and eye fastener flap 40 having a first portion 41 which is secured to the back of main body portion 11 and a second portion 42 which is free to be manipulated through loop 30 and releasably adhered to portion 41. It is understood that two loop/fastener combinations are provided: one for end 27 and one for end 28.

When configured as in FIG. 1, cushion element 25 provides support for the head and/or neck of a large infant or small toddler when the support is placed in use.

Figure 2:
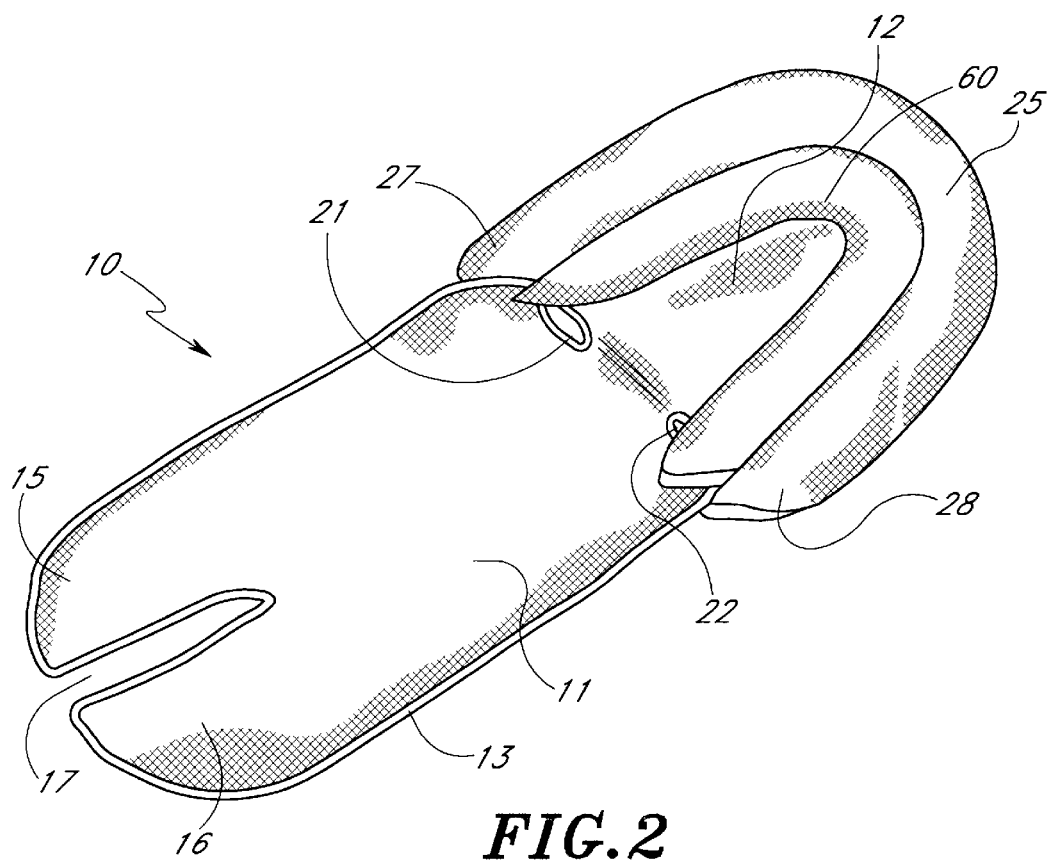
FIG. 2 is a view similar to FIG. 1 showing the supplemental cushion element installed.
Figure 4:
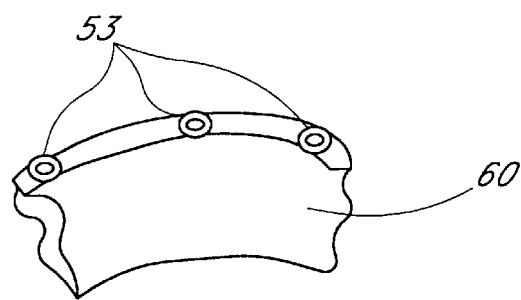
FIG. 4 is a fragmentary bottom view of the supplemental cushion element.

With reference to FIG. 2, a plurality of fastener areas 51 are secured to the exposed surface of upper portion 12 in a semicircular configuration spaced from head cushion element 25. Fastener areas 51 are the hook portion of conventional hook and eye type fasteners in the preferred embodiment. Fastener areas 51 mate with complementary located eye fastener flaps 53 (see FIG. 4) which are provided on the underside of a supplemental cushion element 60 shown in FIG. 2. As seen in this figure, supplemental cushion element 60 is dimensioned and configured to be removably received inboard of cushion element 25 and is used to provide supplemental cushioning for the head and/or neck of a premature or small infant.

In use, the preferred embodiment of the invention is installed in a suitable support, such as a portable child carrier, a safety seat, stroller or the like, and can be readily adjusted, due to the flexibility, to a number of comfortable positions for the infant. For a small infant, the supplemental cushion element 60 is installed to provide the proper head and neck support. As the infant grows, the supplemental cushion element 60 can be removed and cushion element 25 may be relied upon to provide the necessary head and neck support.

As will now be apparent, supports fabricated according to the teachings of the invention provide several advantages over known supports. Firstly, the invention can be fabricated from relatively inexpensive materials in a relatively simple fashion. Secondly, the invention provides a growth adjustability to accommodate a small infant, a large infant and a toddler. In addition, the invention can be used with a wide variety of child carriers, including regular automobile seats, combined child carrier/car seats, strollers and swings. Most importantly, a single such support can be adapted to accommodate the growth of a child from a small infant to a toddler so that a parent need only purchase one such support over this period of growth period.

While the above provides a full and complete disclosure of the preferred embodiments of the invention, various modifications, alternate constructions and equivalents will occur to those skilled in the art. For example, while specific materials have been shown and described, other materials, fasteners and geometrical configurations may be employed if deemed suitable for a given application. For example, although hook and eye fastener areas 51, 53 have been disclosed at discrete locations for releasably retaining the supplemental cushion element 60, one or both of the hook and eye fasteners can be provided along a continuous perimeter of upper portion 12 and/or along the entire length of the underside of supplemental cushion 60. Therefore, the above should not be construed as limiting the invention, which is defined by the appended claims.

What is claimed is:

1. An adjustable head support for use with a child ranging in size from a small infant to a toddler, said support comprising:

a soft pliable body structure having a main body portion, an upper portion, and a pair of flanking openings provided on opposite sides of said structure between the main body portion and the upper portion;

a pair of fastener elements each located on said main body portion adjacent a different one of said pair of flanking openings;

said upper portion having a cushion element arranged along a periphery thereof and terminating in a pair of ends, each of said ends having a fastener engagement member adapted to be secured by a corresponding one of said fastener elements;

a plurality of supplemental fastener elements arranged on said upper portion inboard of said cushion elements; and a supplemental cushion element removably attached to said upper portion inboard of said cushion element.

2. The adjustable head support of claim 1, wherein each of said fastener elements comprises a foldable flap of fastener material.

3. The adjustable head support of claim 1, wherein said fastener engagement member comprises a closed loop.

4. The adjustable head support of claim 1, wherein said supplemental fastener elements are hook fastener elements adapted to engage corresponding eye fasteners on said supplemental cushion element.

5. The adjustable head support of claim 1, wherein said main body portion terminates in a pair of leg segments separated by a gap for accommodating a child seat restraint belt.

6. The adjustable head support of claim 1, wherein said pliable body structure comprises a pair of outer panels and a padding material positioned therebetween.

7. An adjustable head support for use with a child ranging in size from a small infant to a toddler, said support comprising:

a soft pliable body structure having a main body portion, an upper portion, and a pair of flanking openings provided on opposite sides of said structure between the main body portion and the upper portion, the upper portion having an outer seam of binding material;

a pair of fastener elements each located on said main body portion adjacent a corresponding one of said pair of flanking openings;

said upper portion having a cushion element arranged along a periphery thereof and terminating in a pair of ends, each of said ends having a fastener engagement member comprising a closed loop formed by an extension of said binding material, the fastener engagement member adapted to be secured by a corresponding one of said fastener elements;

a plurality of supplemental fastener elements arranged on said upper portion inboard of said cushion elements; and a supplemental cushion element removably attached to said upper portion inboard of said cushion element.

8. An adjustable head support for use with an infant, toddler or child, the head support comprising:

a fabric body having a main body portion and an upper portion;

a head cushion element arranged along the upper portion of the fabric body; and a supplemental cushion element removably secured to the upper portion of the body generally between the head cushion element and the main body portion of the fabric body.

9. The adjustable head support of claim 8, wherein the head cushion element is integrally formed with the fabric body.

10. The adjustable head support of claim 8, wherein the supplemental head cushion element is positioned in close proximity to the head cushion element.

11. The adjustable head support of claim 8, wherein the fabric body and supplemental cushion element include hook and loop fasteners to secure the supplemental cushion element to the fabric body.

12. The adjustable head support of claim 11, wherein one of the hook and loop fasteners is arranged on the fabric body in a semi-circular configuration away from the head cushion element.

13. The adjustable head support of claim 11, wherein one of the hook and loop fasteners extends along an entire length of an underside of the supplemental cushion element.

14. An adjustable head support for use with infants and toddlers comprising:

a fabric body having a main body portion and an upper portion;

a head cushion element positioned on the upper portion of the fabric body in a generally semi-circular configuration;

a supplemental cushion element positioned on the upper portion of the fabric body in a generally semi-circular configuration inboard of the head cushion element;

a plurality of fastener elements arranged on the upper portion of the fabric body between the head cushion element and the main body portion in a generally semi-circular configuration; and a plurality of complementary fastener elements arranged on an underside of the supplemental cushion element, the fastener elements cooperating with the complementary fastener elements to removably secure the supplemental cushion element to the upper portion of the fabric body.

15. The adjustable head support of claim 14, wherein the fastener elements comprise hook and loop fasteners.

16. The adjustable head support of claim 14, wherein the fabric body includes a pair of openings formed on opposite sides of the fabric body between the main body portion and the upper portion, the openings adapted to accommodate a restraining belt therethrough.

17. The adjustable head support of claim 14, wherein at least a portion of the head cushion element is attached to the upper portion of the fabric body.

18. The adjustable head support of claim 14, wherein the main body portion of the fabric body includes a pair of leg portions having a gap therebetween.

19. The adjustable head support of claim 18, wherein the fabric body is comprised of a first panel, a second panel and a padding material between the panels.

* * * * *